United States Patent [19]

Gaillard et al.

[11] Patent Number: 4,897,449

[45] Date of Patent: Jan. 30, 1990

[54] MULTILAYER COMPOSITE INTERPOLYMER COMPRISING A BIMODAL PARTICLE DISTRIBUTION PROCESS FOR ITS PREPARATION AND ITS APPLICATION TO THE REINFORCEMENT OF THERMOPLASTIC MATRICES

[75] Inventors: Patrice Gaillard, Souchez; Jean-Claude Robinet, Lamorlaye, both of France

[73] Assignee: Norsolor, Cedex, France

[21] Appl. No.: 150,021

[22] Filed: Jan. 29, 1988

[30] Foreign Application Priority Data

Jan. 30, 1987 [FR] France ............................... 87 01169

[51] Int. Cl.$^4$ ...................... C08L 19/00; C08L 51/04; C08L 51/00; C08L 33/04
[52] U.S. Cl. ........................................ 525/85; 525/72; 525/77; 525/78; 525/79; 525/80; 525/81; 525/82; 525/193; 525/288; 525/303; 525/305; 525/304; 525/296; 525/301; 525/309; 525/902
[58] Field of Search ............... 525/305, 309, 310, 316, 525/80, 82, 85, 902, 193

[56] References Cited

U.S. PATENT DOCUMENTS 150,032  1/1888  Gaillard et al. .

FOREIGN PATENT DOCUMENTS 2092389  1/1972  France .
2159822  6/1973  France .

Primary Examiner—Carman J. Seccuro
Attorney, Agent, or Firm—Finnegan, Henderson, Farabow, Garrett & Dunner

[57] ABSTRACT

A multilayer interpolymer material of an elastomeric inner phase polymerized from (a) 50–99.9 parts of at least one among: conjugated dienes and alkyl and aralkyl acrylates, (b) 0–49.9 parts of at least one copolymerizable monomer, (c) 0.05–8 parts of at least one crosslinking monomer, and (d) 0.05–6 parts of at least one grafting monomer, and a nonelastomeric outer phase, polymerized from (a) 50–99.9 parts by weight of at least one among: alkyl methacrylates, vinyl aromatic hydrocarbons and unsaturated nitriles, (b) 0.1–50 parts of at least one copolymerizable monomer, and (c) 0–5 parts of at least one chain-limiting agent, the parts being given by weight, it being possible for the said polymer to comprise a nonelastomeric or else elastomeric core phase without grafting and crosslinking monomers. Two populations of particles of mean diameter of approximately 40–150 nm and approximately 160–500 nm respectively are mixed in given ratios. This improves the impact strength of the resultant matrices.

17 Claims, No Drawings

MULTILAYER COMPOSITE INTERPOLYMER COMPRISING A BIMODAL PARTICLE DISTRIBUTION PROCESS FOR ITS PREPARATION AND ITS APPLICATION TO THE REINFORCEMENT OF THERMOPLASTIC MATRICES

The present invention relates to an interpolymer material reinforcing rigid thermoplastic matrices, to its preparation, and to the corresponding reinforced compositions.

Rigid thermoplastic polymers constitute a class of well-known compounds, among which there may be mentioned in particular acrylic polymers such as poly(methyl methacrylate) and many copolymers of methyl methacrylate. Because they are rigid, these thermoplastic polymers are liable to break during the various stages of their conversion, as well as during their transport and their use.

It is known that elastomers may be added to these rigid thermoplastic polymers in order to improve their impact strength. These elastomers are added in variable quantities, usually of at least 5% and, generally, of at least 15% relative to the weight of the rigid polymer. However, an improvement of this kind is frequently obtained at the price of the optical properties and of good behaviour at elevated temperatures.

French Patent No. 2,092,389 provides compositions which partially remedy these disadvantages, as a result of the presence of an additive which chiefly improves the optical properties and consists of an interpolymer of soft-hard morphology, in which the first elastomeric core phase comprises, in particular, an alkyl acrylate, a crosslinking monomer and a grafting monomer, and in which the final rigid phase (or outer layer) is, in particular, a poly(alkyl methacrylate).

In accordance with the Certificate of Addition No. 2,159,822, there is provided, as a reinforcing additive, an interpolymer of soft-hard-soft morphology in which the first stage, non-elastomeric, is polymerized starting with, for example, alkyl methacrylate and, where appropriate, a crosslinking monomer and a grafting monomer; in which the intermediate elastomeric phase is, in particular, an alkyl acrylate-styrene copolymer which may include a crosslinking monomer and a grafting monomer, and in which the final phase is, for example, polymerized starting with alkyl methacrylate. The diameter of the interpolymer particles may then vary from 100 to 300 nm, the preferred range being from 160 to 280 nm.

Furthermore, in a copending U.S. patent application filed on even date herewith by the same inventors and entitled: "Composite interpolymer process for its preparation, its application to the reinforcement of rigid thermoplastic matrices" there is described an interpolymer produced sequentially with the following three phases: elastomer-elastomer-nonelastomer, with the monomers used to constitute the first elastomeric core phase comprising neither crosslinking monomer nor grafting monomer, while the monomers used to constitute the second elastomeric phase comprise these. In the case of a matrix reinforced with a polymer of this kind, this interpolymer enables particularly good impact strength values and optical qualities to be attained.

The applicants have now found that if an interpolymer comprising a mixture of two populations of particles of sufficiently different sizes is employed, then the impact strength could be improved further without damaging the transparency of the remaining matrices. It has been ascertained, in particular, that notched Izod impact values could be obtained which, if the ratio of the two populations of particles involved was chosen correctly, could be markedly superior to those obtained with a population of particles of large size only. The subject of the present invention is therefore firstly a multilayer composite interpolymer comprising at least:

an elastomeric inner phase having per se a glass transition temperature below or equal to 25° C., polymerized from a mixture comprising, per 100 parts by weight:
  (a) from 50 to 99.9 parts by weight of at least one main monomer chosen from conjugated dienes and alkyl or aralkyl acrylates;
  (b) from 0 to 49.9 parts by weight of at least one other monoethylenically unsaturated monomer copolymerizable with the said main monomer,
  (c) from 0.05 to 8 parts by weight of at least one crosslinking monomer; and
  (d) from 0.05 to 6 parts by weight of at least one grafting monomer; and a relatively hard, nonelastomeric outer phase having per se a glass transition temperature above 25° C., polymerized in the presence of the product of the preceding phase, from a mixture comprising, per 100 parts by weight:
  (a) from 50 to 99.9 parts by weight of at least one main monomer chosen from alkyl methacrylates in which the alkyl group contains from 1 to 4 carbon atoms, vinyl aromatic hydrocarbons and unsaturated nitriles;
  (b) from 0.1 to 50 parts by weight of at least one monoethylenically unsaturated monomer copolymerizable with the said main monomer, and
  (c) from 0 to 5 parts by weight of at least one chain-limiting agent, characterized in that it consists of a mixture:
  (1) of a population of particles whose mean diameter is between approximately 40 and 150 nm, preferably approximately 40 to 120 nm, and
  (2) of a population of particles whose mean diameter is between approximately 160 and 500 nm, preferably between approximately 180 and 300 nm, in a weight ratio of the population (1) to the population (2) of between approximately 5/95 and approximately 95/5.

Provision may also be made for at least a fraction of the particles constituting the composite interpolymer according to the present invention to comprise a first phase, forming the core of the particles, which is a relatively hard nonelastomeric phase having a glass transition temperature above 25° C. and polymerized from a mixture comprising, per 100 parts by weight:
  (a) from 70 to 99.9 parts by weight of at least one main monomer chosen from alkyl methacrylates in which the alkyl group contains from 1 to 4 carbon atoms, vinyl aromatic hydrocarbons and unsaturated nitriles (such as acrylonitrile and methacrylonitrile),
  (b) from 0.1 to 10 parts by weight of at least one other monoethylenically unsaturated monomer copolymerizable with the said main monomer;
  (c) from 0 to 10 parts by weight of at least one crosslinking monomer; and
  (d) from 0 to 10 parts by weight of at least one grafting monomer, the inner and outer phases constituting the second and third phases of the interpolymer particles respectively. In this case, the morphology obtained will be called hard-soft-hard.

Provision may also be made for at least a fraction of the particles which is constituting the interpolymer to comprise a first phase, forming the core of the particles, a relatively soft elastomer having a glass transition temperature below or equal to 25° C., polymerized, in the absence of crosslinking monomer and grafting monomer, from a mixture comprising, per 100 parts by weight:
  (a) from 50 to 100 parts by weight of at least one main monomer chosen from conjugated dienes and alkyl or aralkyl acrylates; and
  (b) from 0 to 50 parts by weight of at least one other ethylenically unsaturated monomer copolymerizable with the said main monomer,
the inner and outer phases constituting the second and third phases of the interpolymer particles respectively. In this case, the morphology obtained will be called soft-soft-hard.

In the case of a morphology with two layers, of the soft-hard type, the inner and outer phases may, in particular, represent, respectively, 0.5 to 90 parts by weight and 99.5 to 10 parts by weight, per 100 parts by weight of the interpolymer of each population.

In the case of a morphology with three layers of the soft-soft-hard type, the first, second and third phases may, in particular, represent, respectively, 3 to 80 parts by weight, 10 to 60 parts by weight and 10 to 60 parts by weight, per 100 parts by weight of the interpolymer of each population.

In the case of a morphology with three layers of the soft-hard-soft type, the first, second and third phases may, in particular, represent, respectively, 10 to 40 parts by weight, 20 to 60 parts by weight and 10 to 70 parts by weight, per 100 parts by weight of the interpolymer of each population.

In a preferred embodiment, the weight ratio of the population (1) to the population (2) is between 90/10 and 10/90, and still more particularly between 80/20 and 20/80.

Among the conjugated dienes following within the definition of (a) of an elastomeric phase, there may be mentioned 1,3-butadiene, isoprene, chloroprene and 2,3-dimethylbutadiene. Among the alkyl acrylates falling within this same definition there may be mentioned those which contain $C_1$-$C_{15}$, advantageously $C_1$-$C_8$, and preferably $C_2$-$C_8$ alkyl groups. n-Butyl acrylate, ethyl acrylate, 2-ethylhexyl acrylate and isobutyl acrylate may be mentioned in particular. It would also be possible to employ alkyl acrylates in which the alkyl groups have a longer chain. Among the aralkyl acrylates falling within the abovementioned definition there may be mentioned those in which the cyclic part contains 5, 6 or 7 carbon atoms, with or without an additional alkyl bridge, and the alkyl part contains up to 15 carbon atoms. This list of the acrylates also includes the substituted acrylates such as alkylthioalkyl acrylates (for example ethylthioethyl acrylate) and alkoxyalkyl acrylates (for example methoxyethyl acrylate).

Among the monomers falling within the definition of (a) of a nonelastomeric phase, there may be mentioned methyl methacrylate, which is preferred, ethyl methacrylate, isopropyl methacrylate, n-butyl methacrylate, secbutyl methacrylate, tert-butyl methacrylate, styrene, α-methylstyrene, monochlorostyrene, tert-butylstyrene, vinyltoluene, and the like.

The monoethylnically unsaturated monomers falling within the definition of (b) of a nonelastomeric phase are chosen particularly from alkyl acrylates, alkoxy acrylates, cyanoethyl acrylate, acrylonitrile, acrylamide, hydroxyalkyl acrylates, hydroxyalkyl methacrylates, acrylic acid and methacrylic acid, it being possible for those falling within the definition of (b) of an elastomeric phase to be chosen from alkyl methacrylates, alkoxy acrylates, cyanoethyl acrylate, acrylonitrile, acrylamide, hydroxyalkyl acrylates, hydroxyalkyl methacrylates, acrylic acid, methacrylic acid, and vinyl aromatic hydrocarbons such as styrene, α-methylstyrene, vinyltoluene and the like.

As for the crosslinking monomers falling within the definition of (c) of a core phase, or of an intermediate phase depending on the case, these may be chosen particularly from polyol polymethacrylates and polyacrylates like alkylene glycol dimethacrylates such as ethylene glycol dimethacrylate, 1,3-butylene glycol dimethacrylate, 1,3-butylene glycol dimethacrylate, 1,4-butylene glycol dimethacrylate and propylene glycol dimethacrylate, alkylene glycol diacrylates such as ethylene glycol diacrylate, 1,3- or 1,4-butylene glycol diacrylate and trimethylolpropane trimethacrylate; polyvinyl benzenes such as divinyl benzene and trivinyl benzene, and vinyl acrylate and methacrylate.

The grafting monomers falling within the definition of (d) of a core phase, or of an intermediate phase, depending on the case, may be chosen particularly from allyl, methallyl or crotyl esters of α,β-unsaturated carboxylic acids or diacids like allyl, methallyl and crotyl mono- and diesters of acrylic acid, of methacrylic acid, of maleic acid, of fumaric acid and of itaconic acid; allyl ether, methallyl ether and crotyl vinyl ether; allyl thioether, methallyl thioether and crotyl vinyl thioether; N-allyl-, methallyl- or crotylmaleimide; vinyl esters of 3-butenoic acid and of 4-pentenoic acid; triallyl cyanurate; O-allyl, methallyl or crotyl O-alkyl, aryl, alkaryl or aralkyl P-vinyl, allyl or methallyl phosphonate; triallyl, trimethallyl or tricotyl phosphate, O-vinyl O,O-diallyl, dimethallyl or dicrotyl phosphate; cycloalkenyl mono- and diesters of acrylic acid, of methacrylic acid, of maleic acid, of fumaric acid, of itaconic acid, such as 2-, 3- or 4-cyclohexenyl acrylate; bicyclo[2,2,1]hept-5-en-2-yl mono- and diesters of acrylic acid, of methacrylic acid, of maleic acid, of fumaric acid and of itaconic acid; vinyl ethers and vinyl thioethers of cycloalkenols and of cycloalkenethiols, such as vinyl cyclohex-4-en-1-yl ether, the vinyl ether of bicyclo[2,2,1]hept-5-en-2-ol; vinyl esters of cycloalkenecarboxylic acids such as vinyl cyclohex-3-en-1-carboxylic acid and vinyl bicyclo[2,2,1]hept-5-en-2-carboxylate.

Among the grafting monomers, those preferred are compounds containing at least one allyl group, particularly the allyl esters of ethylenically unsaturated acids. Those more particularly preferred are allyl acrylate, allyl methacrylate, diallyl maleate, diallyl fumarate, diallyl itaconate, allyl hydrogen maleate, allyl hydrogen fumarate and allyl hydrogen itaconate.

The chain limiting agents falling within the definition of (c) of a final phase may be chosen particularly from mercaptans, polymercaptans, polyhalogenated compounds, diunsaturated monoterpenes and monounsaturated diterpenes. tert-Dodecyl mercaptan, sec-butyl mercaptan, n-dodecyl mercaptan and terpinolene may be mentioned.

The composite interpolymers according to the invention are in the form of a latex at a concentration of 20 to 50% by weight, preferably from 30 to 40% by weight, in water, or else in a pulverulent form obtained from the said latex.

In order to prepare the interpolymer according to the invention, the populations (1) and (2) of particles of desired dimensions, prepared sequentially by emulsion polymerization in an aqueous medium, in the presence of a free radical initiator and an emulsifying agent, may be mixed in the desired proportion.

A second process for preparing the interpolymers according to the invention consists in:

separately forming, by polymerization, a seed consisting of the inner phase(s) of the populations (1) and (2);

mixing the two seeds obtained in the preceding stage;

adding the monomer charge corresponding to the outer phase and subjecting it to polymerization conditions, each polymerization being carried out in emulsion, in an aqueous medium, in the presence of at least one free radical initiator and of at least one emulsifying agent.

The proportion of emulsifier is preferably less than 1% by weight, particularly between 0.1 and 0.6% by weight, based on the total weight of the polymerizable monomers charged at each of the stages. As emulsifying agents which may be employed there are found:

anionic surface-active agents like alkali metal alkylbenzenesulphonates, such as sodium dodecylbenzenesulphonate, alkali metal alkylphenoxypolyethylenesulphonates, sodium or potassium lauryl sulphate, salts of long-chain amines and salts of long-chain carboxylic and sulphonic acids;

nonionic surface-active agents, particularly those comprising oxazoline units; those comprising alkylene oxide units, for example alkylphenylpolyoxyethylenated surface-active agents, styrene-ethylene oxide copolymers, propylene oxide-ethylene oxide copolymers and polyoxyethylenated alkyl esters; sorbitan or sorbitol esters and ethers of fatty acids, more particularly polyoxyethylenated sorbitol hexaoleate, sorbitan sesquioleate, sorbitan trioleate and polyoxyethylenated sorbitol monooleate; and cellulose esters or ethers;

cationic surface-active agents, like quaternary onium (ammonium, phosphonium or pyridinium) salts with a hydrophobic substituent such as a long-chain alkyl residue, for example trimethylalkylammonium salts in which the alkyl group contains a long chain of at least 8 carbon atoms; and the onium salts containing a sterically inhibiting substituent such as methylene blue and cyclohexylamine acetate;

or else mixtures of these various types of surface-active agents.

At each stage the polymerization mixture contains an effective quantity of at least one free radical initiator which is activated either by heat or by an oxidation-reduction (redox) reaction. The initiators which may be employed are preferably chosen from persulphates, peroxides, hydroperoxides and diazo compounds such as, for example, azobisisobutyronitrile, 2,2′-azobis(2,4-dimethylvaleronitrile), 1,1′-azobis-1-cyclohexanecarbonitrile, tert-butyl perbenzoate, tert-butylperoxy isopropyl carbonate, and the like. When a persulphate is chosen as an initiator, it may be employed in combination with at least one reducing agent chosen from polyhydrophenols, sodium sulphite and bisulphite, dimethylaminopropionitrile, diazomercaptans and ferricyanides.

The polymerization may be carried out at temperatures between approximately 0 and 125° C., the preferred range being from 30 to 95° C.

The quantity of free radical initiator and, where appropriate, of the reducing agent employed varies as a function of the monomers, of the temperature and of the method of addition, but, as a general rule, remains between approximately 0.01 and 2% by weight in each stage of polymerization, relative to the monomers present.

The interpolymer obtained may be isolated by coagulation or by spray-drying.

The present invention also relates to the application of the interpolymer material such as defined above, to the reinforcement of a matrix of a rigid thermoplastic polymer of at least one monomer chosen from alkyl methacrylates in which the alkyl group contains from 1 to 4 carbon atoms, and vinyl aromatic hydrocarbons, or of a polymer of more than 50% by weight of at least one of these monomers and of at least one other monoethylenically unsaturated copolymerizable monomer. In this application, the present invention relates to a thermoplastic composition comprising, per 100 parts by weight:

from 10 to 99 parts by weight, particularly from 50 to 99 parts by weight, of a rigid thermoplastic polymer of at least one monomer chosen from alkyl methacrylates in which the alkyl group contains from 1 to 4 carbon atoms and vinyl aromatic hydrocarbons, or of a polymer of more than 50% by weight of at least one of these monomers and at least one other ethylenically unsaturated copolymerizable monomer; and from 90 to 1 parts by weight, particularly from 50 to 1 part by weight, of an interpolymer material such as defined above.

In a preferred embodiment, the elastomeric part of the interpolymer material present in the thermoplastic composition represents from 18 to 40 parts by weight, preferably from 24 to 32 parts by weight, of the total thermoplastic composition. Given that it is the total elastomeric phase of the composite interpolymer material which confers the impact strength, the said interpolymer material is added to the rigid thermoplastic matrix in order to give a suitable proportion of the elastomer, as a function of the proportions shown and the rigid phase(s) of the composite interpolymer material must be considered as forming part of the totality of the rigid phase in order to determine the proportions of such mixtures.

The mixing of the composite interpolymer material and of the rigid thermoplastic matrix may be performed using any known process. Thus, the two components may be mixed, both being in the form of a powder, in order to prepare a moulding composition. The mixing may be performed by suspending the interpolymer material in the mixture of the monomers or in the prepolymer syrup which is to produce the rigid thermoplastic matrix. The composite interpolymer material may also be placed in emulsion, suspension and dispersion in water or an organic compound, in the mixture to be run in and to produce the matrix, with the water or the organic compound being removed before or after the formation of the matrix by casting in. The interpolymer material and the rigid thermoplastic matrix may both be mixed in the form of emulsion, suspension or solution in an aqueous or nonaqueous system, the particles being isolated from the water or from the organic compound by coagulation, spraydrying or by known means of separation, and they may then be treated with or without an intermediate drying stage. The cast masses which may be obtained may then be converted into granules and the granules may be processed in an extruder or an injection moulding apparatus. The mixtures may also be cast into sheets between glass plates or metal plates, using known techniques, this process being preferable for the preparation of a glazing material.

Lastly, the invention relates to shaped articles, for example in sheet form (glazing materials, lighting equipment, signs and luminous advertising equipment) and to moulded articles produced by casting or by injection moulding from the thermoplastic composition such as defined above.

A certain number of conventional additives may obviously be incorporated in the interpolymer materials of the invention and the matrices reinforced with such interpolymer materials, using techniques which are well-known to those skilled in the art, in the usual proportions.

It is also possible to envisage the incorporation of compounds which stabilize the products and which prevent degradation due to oxidation, heat and ultraviolet light. The stabilizers may be added at any stage of the polymerization process leading to the formation of the said composite interpolymer material and/or of the matrix, until the last stage of shaping of the final product. It is preferable, however, to incorporate the stabilizers during the polymerizations or in the latices of the polymers resulting from the polymerization.

Stabilizers against degradation by oxidation or by heat, which may be employed in this case, include those which are generally employed in products of addition polymerization. By way of examples, there may be mentioned sterically hindered phenols, hydroquinones, phosphites, their derivatives and combinations thereof.

The stabilizers against ultraviolet light may also be those generally employed for the products of addition polymerization. By way of examples of such stabilizers there may be mentioned various substituted resorcinols, salicylates, benzotriazoles, benzophenones, and combinations thereof.

Other substances which may be incorporated in the interpolymer materials and reinforced matrices of the present invention include lubricants such as stearic acid, stearyl alcohol and eicosanol, colorants including organic dyes such as anthraquinone red, organic pigments and varnishes, such as phthalocyanine blue, and inorganic pigments such as titanium dioxide and cadmium sulphide, fillers and particulate diluents such as carbon black, amorphous silica, asbestos, glass fibres and magnesium carbonate, plasticizers such as dioctyl phthalate, dibenzyl phthalate, butyl benzyl phthalate and hydrocarbon oils.

The experiments which are attached below have been used to illustrate the importance of the relationship of the mixture of the populations of different sizes in the interpolymer material forming the subject of the present invention.

The following abbreviations have been employed in this experimental part:
MMA:methyl methacrylate
MA:methyl acrylate
BuA:butyl acrylate
St:styrene
EDMA:ethylene glycol dimethacrylate
AlMA:allyl methacrylate
TDM:tert-dodecyl mercaptan.

EXAMPLES 1 to 8

Preparation of the seeds (phases A)

A monomer charge containing 95 parts of methyl methacrylate and 5 parts of methyl acrylate is emulsified in water, sodium laurate being used as emulsifier. The monomer charge is polymerized in the presence of potassium persulphate at elevated temperatures.

Firstly, a seed whose particle diameter is 80 nm and, secondly, a seed whose particle diameter is 240 nm, are obtained.

These seeds are mixed in the various proportions by weight which are reported in Tables I and II below. Examples 1 and 8 are comparative.

Formation of the elastomeric intermediate layer of a theoretical thickness of 50 nm A second monomer charge containing BuA, St, EDMA and AlMA is added to the various polymer emulsions, as shown in Table I below and polymerization is carried out using potassium persulphate at temperatures of 85° C.

Formation of the final layer for producing compatibility, of a theoretical thickness of 10 nm A third monomer charge is then added, in the quantities which are also given in Table I below and polymerization is carried out using potassium persulphate at elevated temperatures, while the added quantity of soap is adjusted to prevent the formation of a large number of new particles. The TDM chain-limiter agent is added in order to control the molecular mass of the rigid poly(methyl methacrylate) phases.

The polymer is isolated by coagulation or, preferably, by spray-drying.

The various interpolymer materials obtained are mixed with a matrix of poly(methyl methacrylate) marketed by Altulor under the trade mark "Altulite ® 2774", which has a flow index of 1.5 dg/min and is in the form of moulding powder pellets, in a proportion of 40% of additive to 60% of matrix. These mixtures are transferred to an extruder at a melt temperature of 250° C. and a die gauge pressure of $10^8$ Pa, in order to produce a translucent rigid thermoplastic whose elastomer content is also shown in Table II.

Test specimens were injection-moulded using the various mixtures and their Izod notched impact strength at 23° C. was measured according to ISO standard R-180. The results are reported in Table II.

TABLE I

| Example | 080/0240 weight proportion | weight of 080 hard seed (g) | weight of 0240 hard seed (g) | weight of the monomers used for the elastomer layer (in g) | | | | weight of the monomers used for the layer producing compatibility (g) | | |
|---|---|---|---|---|---|---|---|---|---|---|
| | | | | BuA | St | EDMA | AlMA | MMA | MA | TDM |
| 1 | 100/0 | 0 | 8930 | 1600 | 328 | 82.1 | 41.0 | 631.5 | 33.4 | 3.34 |
| 2 | 90/10 | 169 | 19.8 | 184.0 | 37.7 | 9.4 | 4.7 | 101.3 | 5.4 | 0.5 |
| 3 | 80/20 | 135.2 | 35.7 | 160.7 | 30.9 | 7.7 | 3.9 | 82.4 | 4.4 | 0.4 |
| 4 | 60/40 | 135.2 | 95.2 | 161.4 | 33.1 | 8.2 | 4.1 | 86.7 | 4.6 | 0.5 |
| 5 | 50/50 | 135.2 | 142.9 | 170.0 | 34.8 | 8.7 | 4.4 | 90.0 | 4.8 | 0.5 |
| 6 | 40/60 | 108.2 | 171.4 | 146.3 | 30 | 7.5 | 3.7 | 76.2 | 4.0 | 0.4 |
| 7 | 20/80 | 81.0 | 343.0 | 148.2 | 30.4 | 7.6 | 3.8 | 72.2 | 3.8 | 0.4 |
| 8 | 0/100 | 2070 | 0 | 2164.6 | 443.4 | 111 | 55.6 | 1200 | 63.5 | 6.3 |

TABLE II

| Example | 080/0240 weight ratio | N80/N240 number ratio | Notched Izod impact strength 230° C. |
|---|---|---|---|
| 1 | 100/0 | — | 32 |
| 2 | 90/10 | 243 | 42 |
| 3 | 80/20 | 108 | 45 |
| 4 | 60/40 | 40.5 | 45 |
| 5 | 50/50 | 27 | 45 |
| 6 | 40/60 | 18 | 52 |
| 7 | 20/80 | 6.7 | 50 |
| 8 | 0/100 | — | 42 |

We claim:

1. A multilayer composite interpolymer comprising at least:
   an elastomeric inner phase having per se a glass transition temperature below or equal to 25° C., polymerized from a mixture comprising, per 100 parts by weight:
   (a) from 50 to 99.9 parts by weight of at least one main monomer chosen from alkyl or aralkyl acrylates,
   (b) from 0 to 49.9 parts by weight of at least one other monoethylenically unsaturated monomer copolymerizable with the said main monomer,
   (c) from 0.05 to 8 parts by weight of at least one crosslinking monomer, and
   (d) from 0.05 to 6 parts by weight of at least one grafting monomer, and
   a relatively hard, nonelastomeric outer phase having per se a glass transition temperature above 25° C., polymerized in the presence of the inner phase, from a mixture comprising, per 100 parts by weight:
   (a) from 50 to 99.9 parts by weight of at least one main monomer chosen from $C_1$–$C_4$ alkyl methacrylates,
   (b) from 0.1 to 50 parts by weight of at least one monoethylenically unsaturated monomer copolymerizable with the said main monomer, and
   (c) from 0 to 5 parts by weight of at least one chain-limiting agent,
   the polymerized product of the inner and outer phases having:
   (1) a population of particles whose mean diameter is between approximately 40 and 150 nm; and
   (2) a population of particles whose mean diameter is between approximately 160 and 340 nm,
   the weight ratio of population (1) to population (2) being between approximately 10/90 and approximately 90/10.

2. The interpolymer of claim 1, wherein at least a fraction of the particles of which it consists includes, in addition, a first relatively hard, nonelastomeric phase forming the core of the particles, having a glass transition temperature above 25° C., and polymerized from a mixture comprising, per 100 parts by weight:
   (a) from 70 to 99.9 parts by weight of at least one main monomer chosen from $C_1$–$C_4$ alkyl methacrylates,
   (b) from 0.1 to 10 parts by weight of at least one other monoethylenically unsaturated monomer copolymerizable with the said main monomer,
   (c) from 0 to 10 parts by weight of at least one crosslinking monomer, and
   (d) from 0 to 10 parts by weight of at least one grafting monomer,
   the inner and outer phases constituting the second and third phases of the said fraction of the interpolymer particles respectively.

3. The interpolymer of claim 1, wherein at least a fraction of the particles of which it consists includes, in addition, a relatively soft elastomeric first phase forming the core of the particles, having a glass transition temperature below or equal to 25° C., and polymerized, in the absence of a crosslinking monomer and of a grafting monomer, from a mixture comprising, per 100 parts by weight:
   (a) from 50 to 100 parts by weight of at least one main monomer chosen from alkyl or aralyl acrylates, and
   (b) from 0 to 50 parts by weight of at least one other ethylenicallly unsaturated monomer copolymerizable with the said main monomer, the inner and outer phases constituting the second and third phases of the said fraction of the interpolymer particles respectively.

4. The interpolymer of claim 1, wherein the inner and outer phases represent, respectively, from 0.5 to 90 parts by weight, and from 99.5 to 10 parts by weight, per 100 parts by weight of the interpolymer of each population.

5. The interpolymer of claim 2, wherein the interpolymer is of hard-soft-hard morphology and the first, second and third phases of the said fraction of the particles represent, respectively, from 10 to 40 parts by weight, from 20 to 60 parts by weight, and from 10 to 70 parts by weight, per 100 parts by weight of the interpolymer of each population.

6. The interpolymer of claim 3, wherein the interpolymer is of soft-soft-hard morphology and the first, second and third phases of the said fraction of the particles represent, respectively, from 3 to 80 parts by weight, from 10 to 60 parts by weight, and from 10 to 60 parts by weight, per 100 parts by weight of the interpolymer of each population.

7. The interpolymer of claim 1, wherein the monoethylenically unsaturated monomers of (b) of the outer nonelastomeric phase are selected from the group consisting of alkyl acrylates, alkoxy acrylates, cyanoethyl acrylate, acrylamide, hydroxyalkyl acrylates, hydroxyalkyl methacrylates, acrylic acid and methacrylic acid.

8. The interpolymer of claim 1, wherein the monoethylenicaly unsaturated monomers of (b) of the inner elastomeric phase are selected from the group consisting of alkyl methacrylates, alkoxy acrylates, cyanoethyl acrylate, acrylamide, hydroxyalkyl acrylates, hydroxyalkyl methacrylates, acrylic acid, methacrylic acid and vinyl aromatic hydrocarbons.

9. The interpolymer of claim 1, wherein the crosslinking monomer of (c) of the inner phase is selected from the group consisting of polyol polymethacrylates and polyacrylates, polyvinyl benzenes, vinyl acrylate and vinyl methacrylate.

10. The interpolymer of claim 1, wherein the grafting monomers of (d) of the inner phase are selected from the group consisting of allyl, methallyl or crotyl esters of α,β-unsaturated carboxylic acids or diacids; allyl ether; methallyl ether; crotyl vinyl ether; allyl thioether; methallyl thioether; crotyl vinyl thioether; N-allyl-, methallyl- or crotylmaleimide; vinyl esters of 3-butenoic acid or 4-pentenoic acid; triallyl cyanurate; O-allyl, methallyl or crotyl O-alkyl, aryl, alkaryl or aralkyl P-vinyl, allyl or methallyl phosphonate; triallyl, trimethallyl or tricrotyl phosphate; O-vinyl, O,O-diallyl, dimethyallyl or dicrotyl phosphate; cycloalkenyl esters of acrylic acid, methacrylic acid, maleic acid, fumaric acid or itaconic acid; bicylo-(2,2,I)hept-5-en-2-yl esters of acrylic acid, methacrylic acid, maleic acid, fumaric acid or itaconic acid; vinly ethers and vinly thioethers of cycloalkenols or cycloalkenethiols; and vinyl esters of cycloalkene carboxylic acids.

11. The interpolymer of claim 1, wherein the chain-limiting agent of (c) of the outer phase is selected from the group consisting of mercaptans, polymercaptans, polyhalogenated compounds, diunsaturated monoterpenes and monounsaturated diterpenes.

12. The interpolymer of claim 1, in the form of a latex having a concentration of from 20 to 50% by weight in water.

13. The interpolymer of claim 1, in the form of a powder.

14. A process for preparing the multilayer composite interpolymer of claim 1, comprising:
separately forming, by polymerization, an inner seed phase of the population of (1) and of (2),
mixing together the two inner seed phases obtained in the preceding step,
adding the inner seed mixture, the mixture of the outer phase and subjecting it to polymerization conditions,
each polymerization being carried out in emulsion, in an aqueous medium, in the presence of at least one free radical initiator and a least one emulsifying agent.

15. A transparent thermoplastic composition comprising a mixture of, per 100 part by weight:
from 10 to 99 parts by weight of a rigid thermoplastic polymer of at least one monomer selected from the group consisting of $C_1$–$C_4$ alkyl methacrylates, vinyl aromatic hydrocarbons, or a polymer having more than 50% by weight of at least one these monomers and at least one other monoethylenically unsaturated copolymerizable monomer, and
from 90 to 1 parts by weight of the interpolymer of claim 1.

16. The thermoplastic composition of claim 15, wherein the elastomeric part of the thermoplastic material present in the said composition represents from 18 to 40 parts by weight of the latter.

17. A shaped article of the thermoplastic composition of claim 15.

* * * * *

UNITED STATES PATENT AND TRADEMARK OFFICE
CERTIFICATE OF CORRECTION

PATENT NO. : 4,897,449
DATED : January 30, 1990
INVENTOR(S) : Patrice GAILLARD et al.

It is certified that error appears in the above-identified patent and that said Letters Patent is hereby corrected as shown below:

Claim 3, column 10, line 42, change "aralyl" to --aralkyl--.

Claim 15, column 12, line 11, change "part" to --parts--.

Signed and Sealed this

Twenty-fourth Day of December, 1991

Attest:

HARRY F. MANBECK, JR.

*Attesting Officer*      *Commissioner of Patents and Trademarks*